Jan. 6, 1970 — R. C. STRAUSS — 3,487,715
VEHICLE DRIVING CONTROLS
Filed Dec. 11, 1968 — 2 Sheets-Sheet 1
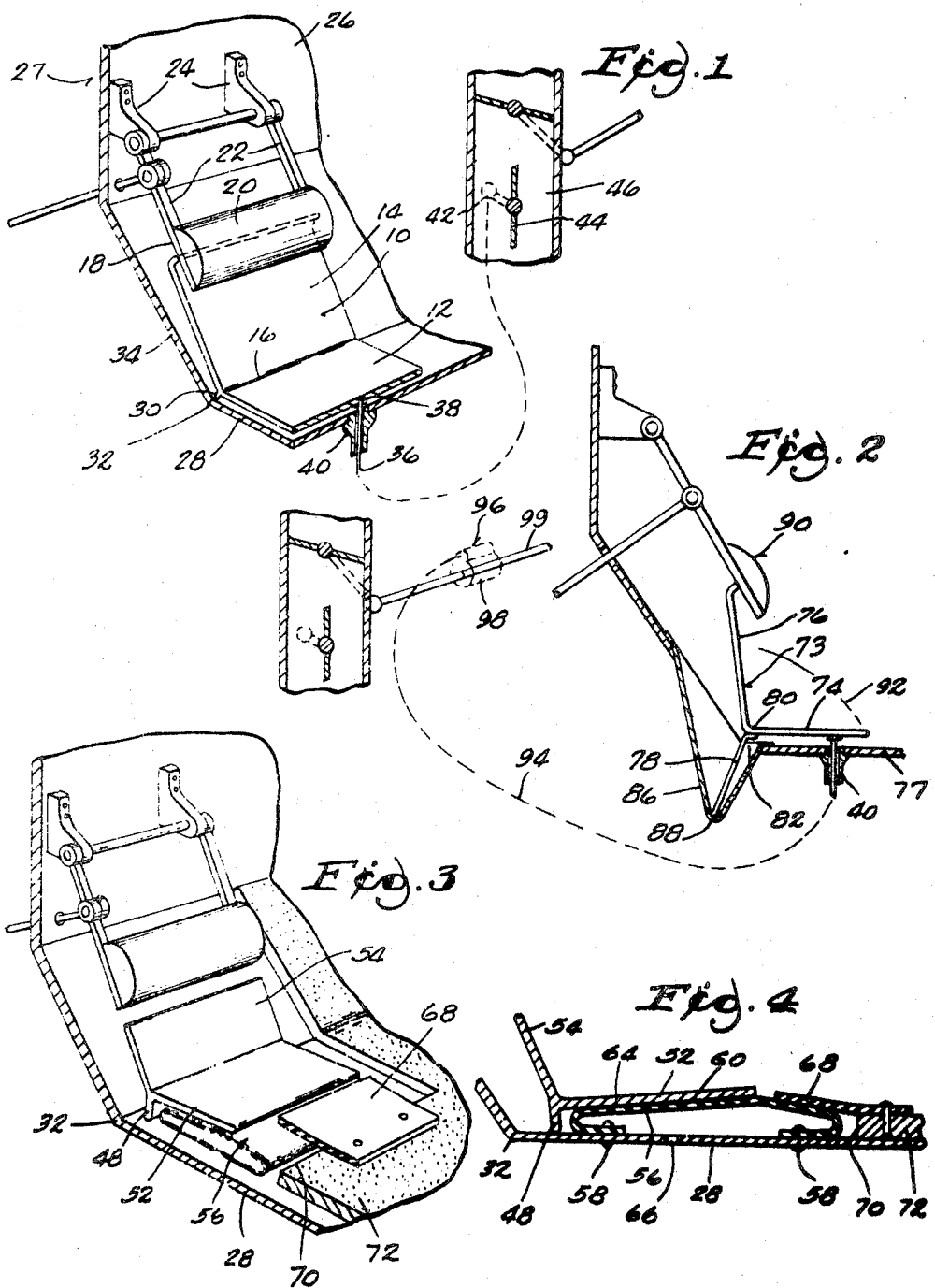
INVENTOR
RAYMOND C. STRAUSS
BY Wheeler, Wheeler, Haines & Clemency
ATTORNEYS Jan. 6, 1970   R. C. STRAUSS   3,487,715
VEHICLE DRIVING CONTROLS
Filed Dec. 11, 1968   2 Sheets-Sheet 2
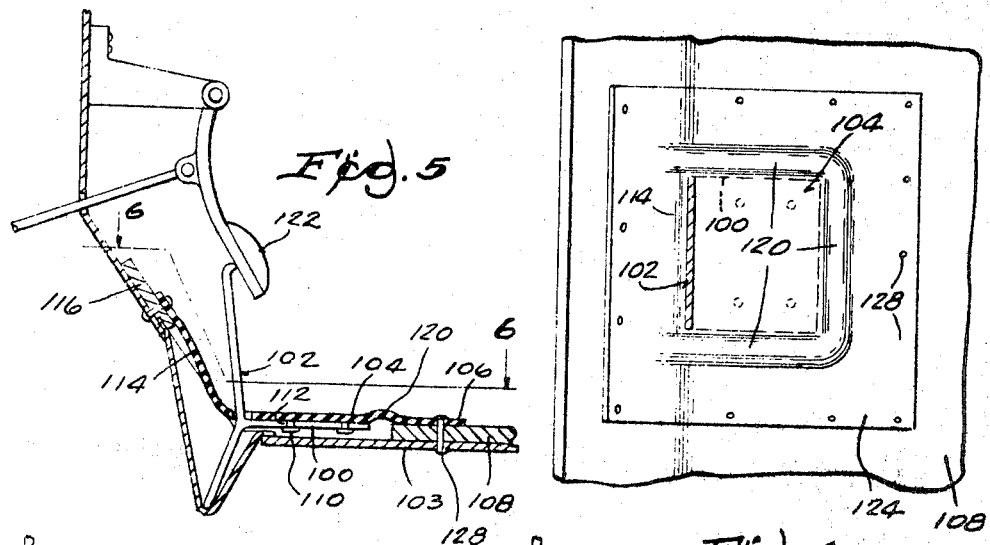
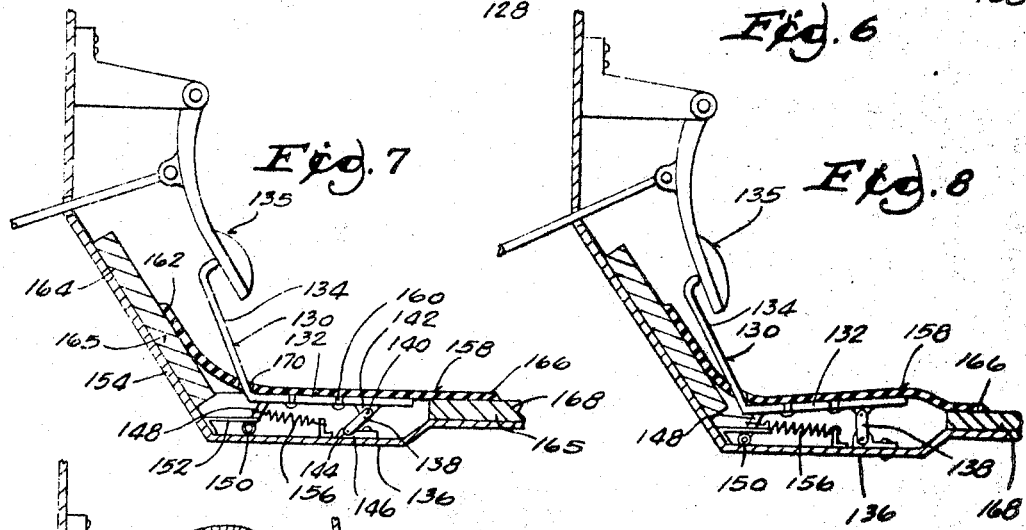
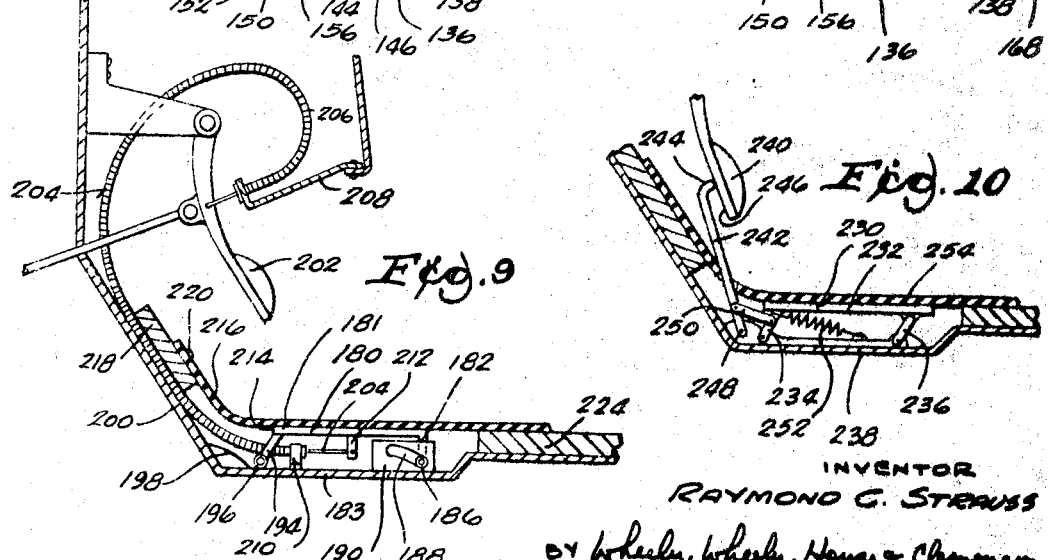
INVENTOR
RAYMOND C. STRAUSS
BY Wheeler, Wheeler, House & Clemency
ATTORNEYS United States Patent Office 3,487,715
Patented Jan. 6, 1970

3,487,715
VEHICLE DRIVING CONTROLS
Raymond C. Strauss, 301 W. Lenawee St.,
Lansing, Mich. 48914
Continuation-in-part of application Ser. No. 642,110,
May 29, 1967. This application Dec. 11, 1968, Ser.
No. 783,061
Int. Cl. G05g 1/18
U.S. Cl. 74—513                                21 Claims

ABSTRACT OF THE DISCLOSURE

Heelrests with a horizontal extending platform are provided for use with the foot pedals in a vehicle. The heelrests are movably supported on the vehicle floorboard and also connected to the associated pedal to afford upward and forward movement of the vehicle operator's heel upon actuation of the pedal.

CROSS REFERENCE TO RELATED APPLICATION

The present application is a continuation-in-part of my copending application Ser. No. 642,110 filed May 29, 1967, now Patent No. 3,426,615.

BACKGROUND OF INVENTION

Foot pedals in use in present day automobiles typically have the pedal located at the lower end of a pivotally supported or pendulum suspended pedal bracket. Pedals of this type commonly result in the vehicle operator resting the heel of his foot on the horizontal floorboard or floor mat of the driving compartment with the toe resting on the pedal and riding the pedal. During use of the pedal and as forward pressure is applied, the toe of the operator's foot moves forwardly, and the heel slides along the floorboard. Final heavy pressure will usually result in the heel being raised completely off the mat. When the pedal is released, the heel jams against the floorboard unless it is lifted for relocation at a rearward position. Furthermore, when the operator is using his left foot for left foot braking, the operator typically finds it convenient to rest the ball of the foot against the pedal in anticipation of use. This often results in the muscles of the operator's foot and leg remaining in a tense condition to hold the foot back. "Riding" the brake pedal can also cause the brake pedal to vibrate during vehicle movement, thereby causing the master cylinder brake plunger to load up the brake lines with pressure, thus dragging the brakes. Although studies have shown that it is desirable to use the left foot for braking to minimize the response or reaction time, existing pedal designs make this awkward and fatiguing.

Furthermore, "riding" the brake pedal can cause illumination of the brake lights. The lack of support provided for the right foot causes vibration of the accelerator pedal during vehicle movement, which results in wasted fuel. With a pendulum suspended clutch, "riding" the pedal in anticipation of use can cause premature wear of the throwout bearing of the clutch.

SUMMARY OF INVENTION

The invention provides a heelrest for use with a vehicle pedal, such as a brake pedal, accelerator pedal or clutch pedal, which provides stability for the operator's foot and guides and supports the foot upon depression of the pedal and during return of the foot to its initial relaxed position. The stability afforded for the operator's foot also permits "riding" the pedal without actuating the controls connected to the pedal.

The heelrest includes a generally horizontally extending platform or shelf. Means are provided to mount the platform on the floorboard of the vehicle. Means are also provided to connect the platform of the heelrest to the pedal to afford upward and forward movement of the heelrest and of the driver's heel upon actuation of the pedal to maintain the toe of the operator's foot in the initial contact location on the pedal and the heel in the initial contact location on the platform. Upon release of pressure upon the pedal, the heel weight on the platform returns the heelrest to the relaxed horizontal position parallel or flush with the floorboard and the pedal to its nondepressed position.

An object of this invention is to provide a heelrest for the heel of an operator's foot, which is responsive to the pressure on the pedal and which raises the operator's heel upwardly and forwardly in spaced pursuit of the pedal during actuation of the pedal and then, through relaxed weight thereon provides a backward pulling force to the pedal so that pressure on the heelrest the returns the pedal to the released position.

Another object of this invention is to provide forms of flexible protectors, such as aprons, bellows, and diaphragms to prevent debris from entering between the heelrest and the vehicle floorboard, to assure operating efficiency at all times.

Another object of this invention is to provide a generally horizontal heelrest platform which is flush or merges with the carpeting, particularly in the driving compartment of a vehicle, so that a driver's feet will not be hampered by projections when entering or leaving the vehicle.

Another object of this invention is to provide a heelrest which rises and moves in the direction of pedal application in arcuate sweeps about a pivot support at the forward edge of the heelrest.

Another object of the invention is to provide a heelrest in the form of a platform and in which all points on the platform rise upwardly and forwardly in the same arc to afford a choice of heel locations for maximum comfort and also equal leverage irrespective of the location of the operator's heel on the platform.

An additional object of the invention is to provide a heelrest which rotates upon application of pressure on the associated pedal to maintain the toe of the operator's foot in its initial contact location with the pedal.

A further object of the invention is to provide a heelrest which affords comfort and stability for the operator's foot to make left foot braking comfortable and convenient.

Another object of the invention is to provide apparatus which is responsive to actuation of a heelrest and which decreases fuel flow in the carburetor.

Further objects and advantages of the present invention will become apparent from the following description and accompanying drawings.

DRAWINGS

FIGURE 1 is a perspective view of a heelrest in accordance with the invention.

FIGURE 2 is a side elevational view in fragmentary section of a further embodiment of the invention.

FIGURE 3 is a perspective view of an additional embodiment of the heelrest of the invention.

FIGURE 4 is a sectional view along line 4—4 of FIGURE 3.

FIGURE 5 is a modified embodiment of the heelrest shown in FIGURE 2.

FIGURE 6 is a view taken along line 6—6 of FIGURE 5.

FIGURE 7 is an additional embodiment of the heelrest of the invention.

FIGURE 8 is a view of the embodiment shown in FIGURE 7 with the pedal in a depressed position.

FIGURE 9 is a further embodiment of the heelrest of the invention.

FIGURE 10 is a further embodiment of the heelrest of the invention.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawings, FIGURE 1 shows a heelrest which is generally designated 10 and which includes first and second angularly related legs 12 and 14. Leg 12 extends rearwardly from a juncture 16 to form a generally flat, horizontally extending shelf or platform for receiving the heel of the operator's foot. Means are provided for connecting a pedal to the platform 14. In the disclosed construction the means comprises the leg 14 which extends transversely upwardly from the juncture 16 to engage the undersurface 18 of pedal 20. The pedal 20 can be an accelerator, brake or clutch pedal. Means are provided for supporting the pedal above the base 28 of the vehicle in the form of a pair of arms 22, which are pivotally connected to brackets 24, which are secured to the fire wall 26 of a vehicle 27.

In accordance with the invention, means are provided for mounting the heelrest 10 upon the floorboard or base 28 of the vehicle 27 to afford upward and forward movement of the platform upon depression of pedal 20. In the construction disclosed in FIGURE 1, the means is in the form of a bracket 30 which extends downwardly from the juncture 16 to engage the juncture 32 between base portion 28 and angularly connected wall portion 34. Alternatively, the juncture 16 can engage juncture 32 to form the pivotal connection.

In accordance with the invention, means are provided which are adapted for connection to the carburetor to decrease fuel flow upon actuation of the heelrest 10. As disclosed, the means includes a flexible shaft or cable 36, which has an end 38 connected to the platform 12. The cable 36 is anchored to the base 28 by a boss or cable fitting 40. The other end 42 of the cable 36 is connected to a secondary throttle shutter 44, which is pivotally mounted in the fuel-air passage 46 in the carburetor (not shown in detail).

In operation of the heelrest shown in FIGURE 1, as the pedal 20 is depressed the heelrest 10 pivots about bracket 30 and platform 12 swings upwardly and forwardly raising cable end 38 and closing throttle shutter 44. The arcuate movement of the platform 12 is such that the heel and toe of the operator's foot remain in their initial contact locations on the heelrest 12 and the pedal 20 as the pedal 20 is depressed. Heel weight on the platform 12 provides a rearward and upward thrust on the pedal when the downward or forward pressure on the pedal is released, thus returning the pedal 20 and platform 12 to a released position.

FIGURE 3 discloses a modified embodiment of the heelrest shown in FIGURE 1 in which the means provided for mounting the heelrest 16 on the base comprises a bracket 48 which depends from the platform 52 adjacent its juncture with leg 54. The bracket 48 can engage the floorboard or base at a point spaced from the juncture 32 of base portions 28 and 34. The leg 54 can extend in the same plane or in a plane rearwardly of the pedal 20. Thus there is no connection between the leg 54 and the pedal, and the leg 54 supports the toe portion of the foot. In the alternative the leg 54 can extend upwardly for engagement with the pedal.

In FIGURE 3 the means provided for mounting the heelrest on the floorboard includes a flexible diaphragm or bellows 56, which is located between platform 52 and base 28. The diaphragm 56 is anchored to the base 28 by fasteners 58 (FIGURE 4). The upper surface 60 of the diaphragm can be secured to the undersurface 26 of the platform 52 by an adhesive 64. The floorboard or base 28 can be provided with a vent 66, which desirably has a filter and which affords entry of air as the diaphragm expands and escape of air from the diaphragm 56 when the platform 52 returns to the relaxed position. The diaphragm 56 also prevents debris from entering the area beneath the platform 52, where it could interfere with platform movement.

A rubber apron 68 can be provided to afford a smooth, continuous surface around the pltform 52. The apron 68 also prevents debris from reaching the base or floorboard 28 between the edge 70 of carpet 72 and the diaphragm 56.

FIGURE 2 shows a further embodiment of the invention in which the heelrest 73 has a first leg or horizontal platform 74 which is connected to an upstanding second leg 76. The means provided for mounting the platform 74 to the floorboard or base 77 comprises a bracket 78, which is connected to the juncture 80 of platform 74 and leg 76 and which projects through an aperture 82 in the base 77 and is pivotally supported in a pocket or gusset 86, which has a bottom 88 located below the level of the base 77. As the pedal 90 is depressed, the platform 74 traverses an arc 92 which provides less rise of the foot during pivotal movement, as compared with the heelrest shown in FIGURES 1 and 3. This substantially reduces relative movement in the ankle joint to provide increased comfort for the vehicle operator.

The embodiment shown in FIGURE 2 also includes a flexible shaft 94 which is connected to a fluid pressure valve 96 on a vacuum disconnect unit 98, which is carried by a throttle rod or link 99 which is connected to an accelerator pedal (not shown). The pedal 90 is a brake pedal. Upon depression of pedal 90, cable 94 opens valve 96 to actuate the disconnect and break the link between the accelerator and the carburetor to stop fuel flow.

FIGURE 5 discloses a modified embodiment of the heelrest arrangement shown in FIGURE 2. In FIGURE 5 the heelrest 102 includes a shelf or platform 100. The means provided for mounting the platform 100 to the base 103 includes a flexible protector 104, which overlays the platform 100 and is secured along its rearwardmost edge 106 to a carpet 108 which is cut away around the edges of platform 100 to allow the platform 100 to be recessed. The protector is also secured to the platform 100 by fasteners 110, which can be in the form of grommets which are integral with the protector 104 and which project through apertures 112 of the platform 100. The upper portion 114 of the protector 104 overlays a carpet portion 116. The portion 114 and the edge portions 120 of the protector 104 adjacent the edges of the platform 100 can be formed into a ridge or fold 120 of an excess of material to afford lateral as well as upward and forward yielding of the protector 104 upon depressing the pedal 122. The protector also includes a generally rectangular margin 124 (FIGURE 6) which is anchored to the carpet 108 and floorboard 103 by fasteners 128.

FIGURE 7 discloses a further embodiment of the invention which includes a heelrest 130 with a first leg or rearwardly extending shelf or platform 132 and a second leg or upwardly extending leg 134 which forms the means for connecting the platform 132 to the pedal 135.

The means provided for mounting the platform 132 to the floorboard or base 136 comprises a link 138, which has one end 140 pivotally connected to platform 132 at a point 142 spaced forwardly from the rearwardmost edge of platform 132 and the other end 144 pivotally connected to the floorboard 136 at a point 146, which is forwardly of point 142, when the heelrest 130 is in the relaxed or released position shown in FIGURE 7. The means can also include a bracket 148, which depends from platform 132 adjacent its forward end. Bracket 148 is desirably provided with a roller 150 which travels along the floorboard 136. A guide member 152 with a longitudinal slot extends rearwardly from floorboard portion 154 and receives bracket 148. A return spring 156 having one end connected to bracket 148 and the other end connected to the floorboard 136 can be provided to return the heelrest to the relaxed position shown in FIGURE 7.

The means for mounting the platform 132 to the floorboard 136 can also include a protector 158 in the form of an apron, which overlays the platform 132 and is secured to platform 132 by fasteners 160. The forward end 162 of the protector 158 is in sliding engagement with the carpet portion 164 of carpet 165. The rear end 166 of protector 158 is in sliding engagement with carpet portion 168. The side edges of the protector 158 are in sliding engagement with the surface of the carpet 165. The second leg 134 extends through an opening 170 in the protector 158.

In operation of the embodiment of the invention shown in the FIGURES 7 and 8, forward pressure on pedal 135 by the operator's foot will cause the platform 132 to travel upwardly and forwardly as shown in FIGURE 8, with a minimum of lift of the operator's heel. During movement of the heelrest 130 the protector 158 slides along the carpet portions 164 and 168.

Referring to FIGURE 9, a modified form of heelrest 180 is shown which includes a platform 181. The means provided for mounting the platform 181 to the floorboard 183 to afford upward and forward movement of the heelrest comprises a leg 182, which depends from the platform 181 adjacent its rearward end. Depending leg 182 includes a roller 186 which is located in an elongated slot, track or cam raceway 188 in an upstanding bracket 190 connected to the floorboard 183. The heelrest 180 also includes a depending bracket 194, which is provided with a roller 196, which rotatably engages the floorboard 183. The floorboard 183 can also be provided with ramp 198 at the juncture of floorboard section 183 and floorboard section 200.

The means provided for connecting the pedal 202 to the platform 181 comprises a flexible cable 204 which has a cable sheath 206 connected at its upper end to a bracket 208, which is secured to the vehicle dashboard or fire wall. The lower end of the sheath 206 is anchored to the floorboard 183 by a clamp 210. The cable 204 can be connected to a bracket 212 which depends from platform 181.

In operation of the embodiment shown in FIGURE 9 forward pressure on pedal 202 will pull the heelrest platform 181 forwardly and upwardly as the roller 186 travels forwardly and upwardly in the raceway 188. The ramp is desirably provided with a slope such that the forward portion 214 of platform 181 will travel upwardly at a rate equal to the rearward end of the platform 181. Thus, the operator's heel will raise and move forwardly along the same arcuate path when the operator's heel is located at any point upon the platform 181, making it possible for the operator to rest his heel at any point on the platform 181 and obtain the same upward and forward movement with the same arcuate path. When the forward pressure on the pedal 202 is released, the relaxed foot and leg weight on the platform 181 causes the platform to travel downwardly and rearwardly causing the flexible shaft 204 to return the pedal 202 and the operator's foot to a released or relaxed position. As in the other embodiments, the heelrest 180 can be provided with a protector 216, which is secured to the platform 181 and which also can be secured to the carpet 218 at its upper end 220. The rear end of the protector can slide over the carpet portion 224 during the operation of the heelrest.

FIGURE 10 shows an additional embodiment of the heelrest of the invention with the heelrest generally designated 230 and including a platform 232. The means provided for mounting the heelrest to the floorboard to afford upward nad forward movement comprises a pair of parallel links 234 and 236, which have one end secured to the platform 232 at spaced locations and the other ends pivotally connected to the floorboard 238 at spaced locations. The means provided to connect the pedal 240 to the platform 232 comprises an upstanding link 242, which has an upper end 244 in sliding engagement with the forward or undersurface 246 of pedal 240. The lower end of the link 242 is pivotally connected to the floorboard 238 at 248. The link 242 is also connected to link 234 by a cross link 250. A return spring 252 can be provided to assist in moving the heelrest 232 to its relaxed position. As in the other embodiments, a protector 254 can be secured to the platform 232 to prevent debris from interfering with the heelrest operation and to provide a smooth, continuous floor.

The stability and comfort afforded by the heelrests of the invention make left foot braking comfortable and convenient, thus eliminating the awkwardness and fatigue commonly experienced with left foot braking. Furthermore, the heelrests of the invention permit "riding" of any pedal such as clutch, brake or accelerator with a relaxed foot without actuating the controls associated with the pedal.

Although the heelrests of the invention have generally been described in connection with foot controls for a vehicle, the heelrests can also be used with other types of pedal controls, as for instance with organ or piano pedals, industrial machinery and any on-off controls.

I claim:

1. Control apparatus comprising a base, a pedal, means for supporting said pedal above said base, a heelrest, said heelrest including a generally horizontally extending platform, means for mounting said platform on said base at a position with respect to said pedal to afford simultaneous engagement of the toe of operator's foot with said pedal and the heel of the operator's foot with said platform, said means affording movement of said platform relative to said base, and means for connecting said pedal to said platform to afford upward and forward movement of said platform to maintain the toe and heel of the operator's foot at their initial contact locations on said pedal and said platform upon forward and rearward movement of said pedal.

2. Control apparatus comprising a base, a pedal, means for supporting said pedal above said base, a heelrest, said heelrest including a generally horizontal extending platform, a flexible member located between said platform and said base and means connecting said flexible member to said platform and to said base.

3. Control apparatus in accordance with claim 1 wherein said means for mounting said platform on said base comprises an upwardly and forwardly inclined cam track on one of said base and said platform and a cam follower on the other of said platform and said base.

4. Control apparatus in accordance with claim 1 wherein said means for mounting said platform on said base comprises a first link having one end pivotally connected to said platform and the other end pivotally connected to said base, a second link, having one end pivotally connected to said platform at a point spaced from the connection of said first link to said platform and the other end pivotally connected to said base at a point on said base spaced from the connection of said first link with said base, said first and second links being in parallel relationship.

5. Control apparatus in accordance with claim 1 wherein said means for connecting said pedal to said platform comprises an upwardly and forwardly extending leg connected to said platform, said leg having an upper end in engagement wtih said pedal.

6. Control apparatus in accordance with claim 1 wherein said means for connecting said pedal to said platform comprises a flexible cable having one end connected to said pedal and the other end connected to said platform.

7. Control apparatus in accordance with claim 1 wherein said means for connecting said pedal to said platform comprises a first link having one end engaging said pedal and the other end pivotally connected to said base, and a second link operatively connecting said first link to said platform.

8. Control apparatus in accordance with claim 1 wherein said means for mounting said platform on said base comprises a bracket depending from said platform, the lower end of said bracket engaging said base.

9. Control apparatus in accordance with cliam 8, wherein said base has an aperture, and said bracket projects through said aperture and means for pivotally supporting the end of said bracket beneath said base.

10. Control apparatus in accordance with claim 1 wherein sand means for mounting said heelrest on said base includes a link, said link having one end pivotally connected to said platform and the other end pivotally connected to said base.

11. Control apparatus in accordance with claim 10, including a depending bracket on said platform, and a roller at the end of the bracket which rotatably engages said base.

12. Control apparatus in accordance with claim 11 including an upwardly inclined ramp on said base engageable with said roller during movement of said platform.

13. Control apparatus in accordance with claim 1 wherein said means for mounting said platform on said base comprises a flexible protector overlaying said platform and said flexible protector having edges secured to said base.

14. Control apparatus in accordance with claim 13 wherein said platform has side and rear edges and said flexible protector includes a fold along the said side edges and rear edge of said platform.

15. Control apparatus in accordance with claim 1 wherein said means for mounting said platform on said base comprises a flexible protector overlaying said platform and secured thereto, said protector being in sliding engagement with said base.

16. Control apparatus in accordance with claim 2 wherein said flexible member comprises a diaphragm located between said platform and base, said diaphragm being secured to said base and to said platform.

17. In combination with a pendulum suspended pedal operable by the ball of an operator's foot, a heelrest with first and second legs, said second leg being transverse to said first leg and said first leg projecting laterally to form a shelf for the support of the heel of the operator's foot, and said second leg projecting toward said pedal to engage said pedal for movement of said heelrest responsive to movement of said pedal, a base having first and second angularly related base portions, the juncture of said first and second legs engaging the juncture of said first and second base portions to pivotally support said heelrest.

18. Apparatus in accordance with claim 17, including an engine having a carburetor, said carburetor having a secondary throttle shutter therein, and means connecting said heelrest to said throttle shutter for movement of said shutter responsive to movement of said heelrest.

19. Apparatus in accordance with claim 17, including an engine having a carburetor with a throttle shutter, a link adapted to connect said shutter to an accelerator pedal, and means connected to said link and to said heelrest to disconnect said link from said throttle shutter upon actuation of said heelrest.

20. In combination with a pendulum suspended pedal operable by the ball of an operator's foot, a heelrest with first and second legs, said second leg being transverse to said first leg and said first leg projecting laterally to form a shelf for the support of the heel of the operator's foot, and said second leg projecting toward said pedal to engage said pedal for movement of said heelrest responsive to movement of said pedal, and wherein said heelrest includes a bracket extending transversely from the juncture of said first and second legs, a floor in a vehicle and wherein said bracket extends through said floor, and means pivotally supporting said bracket beneath said floor.

21. In combination with a pendulum suspended pedal operable by the ball of the operator's foot, a base, a heelrest with first and second legs, said second leg being transverse to said first leg and said first leg projecting laterally to form a shelf for the support of the heel of the operator's foot, and said second leg projecting toward said pedal to engage and support the toe portion of the operator's foot, and means for supporting said first leg on said base to afford upward and forward movement of said first leg upon depressing said pedal.

References Cited

UNITED STATES PATENTS

| | | | |
|---|---|---|---|
| 1,403,443 | 1/1922 | Paul | 74—513 |
| 3,108,651 | 10/1963 | Miller | 180—90.6 |
| 3,383,938 | 5/1968 | Hollub | 74—478.5 |

MILTON KAUFMAN, Primary Examiner

U.S. Cl. X.R.

74—564; 180—90.6; 192—3